(12) United States Patent
Kono

(10) Patent No.: US 8,380,187 B2
(45) Date of Patent: Feb. 19, 2013

(54) MOBILE TERMINAL

(75) Inventor: Tatsuya Kono, Tachikawa (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1471 days.

(21) Appl. No.: 11/809,859

(22) Filed: Jun. 1, 2007

(65) Prior Publication Data

US 2008/0125113 A1 May 29, 2008

(30) Foreign Application Priority Data

Nov. 24, 2006 (JP) ................................ 2006-317756

(51) Int. Cl.
*H04W 4/00* (2009.01)
*H04W 36/00* (2009.01)
(52) U.S. Cl. ...................... 455/432.1; 455/436; 455/439
(58) Field of Classification Search ............... 455/432.1, 455/433, 436–444
See application file for complete search history.

(56) References Cited

U.S. PATENT DOCUMENTS

| 5,903,832 A * | 5/1999 | Seppanen et al. .......... 455/435.3 |
| 2006/0252424 A1 | 11/2006 | Ohno et al. | |

FOREIGN PATENT DOCUMENTS

| JP | 2000-13846 A | 1/2000 |
| JP | 2006-295684 A | 10/2006 |

OTHER PUBLICATIONS

Japanese Office Action dated Feb. 24, 2009 (2 pages), and English translation thereof (2 pages), issued in counterpart Japanese Application Serial No. 2006-317756.

\* cited by examiner

*Primary Examiner* — Huy C Ho
(74) *Attorney, Agent, or Firm* — Maschoff Gilmore & Israelsen

(57) ABSTRACT

A mobile terminal determines, if a communication request is input, whether a connection destination mobile communication network system is a first mobile communication network system as a subscription mobile communication network system, or a second mobile communication network system as a roaming destination mobile communication network system. When it is determined that the connection destination mobile communication network system is the second mobile communication network system, a mobile terminal user is notified of information indicating a roaming state. When an input of a connection destination change request is received, a mobile communication network system reselection process is performed for changing the connection determination mobile communication network system from the second mobile communication network system to the first mobile communication network system.

17 Claims, 6 Drawing Sheets

MOBILE TERMINAL

CROSS-REFERENCE TO RELATED APPLICATIONS

This application is based upon and claims the benefit of priority from prior Japanese Patent Application No. 2006-317756, filed Nov. 24, 2006, the entire contents of which are incorporated herein by reference.

BACKGROUND OF THE INVENTION

1. Field of the Invention

The present invention relates to a mobile terminal having a roaming function.

2. Description of the Related Art

In the field of mobile communications, a service called roaming is implemented in order to receive a communication service of a non-subscription carrier outside the service area of a subscription carrier. For example, if a mobile terminal having such a roaming function cannot receive a radio signal from a subscription mobile communication network system, the mobile terminal searches a receivable mobile communication network system of another carrier. When the mobile communication network system which can be used as a roaming destination is found by this search, the mobile terminal proceeds to a standby state in synchronism with a base station in the found mobile communication network system. During roaming, the mobile terminal periodically performs system reselection control to try to change a connection destination to a subscription mobile communication network system (see, e.g., Jpn. Pat. Appln. KOKAI Publication No. 2000-13846).

However, if a conventional mobile terminal having such a roaming function tries to make an outgoing call or activate a browser in connection with a roaming destination mobile communication network system, this mobile terminal may actually be in the service area of a subscription carrier (HOME carrier). This is because the service areas of a subscription carrier and a roaming destination carrier overlap each other. The communication fee of the roaming destination carrier is generally higher than that of the subscription carrier. Hence, if a user unintentionally performs communication such as speech communication or Web access via the network of the roaming destination carrier, a problem may occur upon charging high communication fee later.

In order to solve such a problem, the mobile terminal may frequently perform system reselection control during roaming to return the connection destination to the subscription mobile communication network system as much as possible. However, with this operation, the mobile terminal consumes a large amount of power every system reselection control cycle, thereby shortening the battery life.

BRIEF SUMMARY OF THE INVENTION

It is an object of the present invention to provide a mobile terminal which can perform communication without using a roaming service as much as possible, thereby preventing an unnecessary trouble about a communication fee and the like and preventing an increase in power consumption.

In order to achieve the above object, according to an aspect of the present invention, there is provided a mobile terminal adapted to be selectively connected to a first subscription mobile communication network system and a second roaming destination mobile communication network system, the terminal determines, if a communication request is input, whether a connection determination mobile communication network system is the first mobile communication network system or the second mobile communication network system. When it is determined that the connection destination mobile communication network system is the second mobile communication network system, a mobile terminal user is notified of information indicating roaming state. When the input of the connection destination change request is received, a mobile communication network system reselection process is performed for changing the connection determination mobile communication network system from the second mobile communication network system to the first mobile communication network system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

An embodiment of the present invention will be described below with reference to the accompanying drawing.

Figure 1:
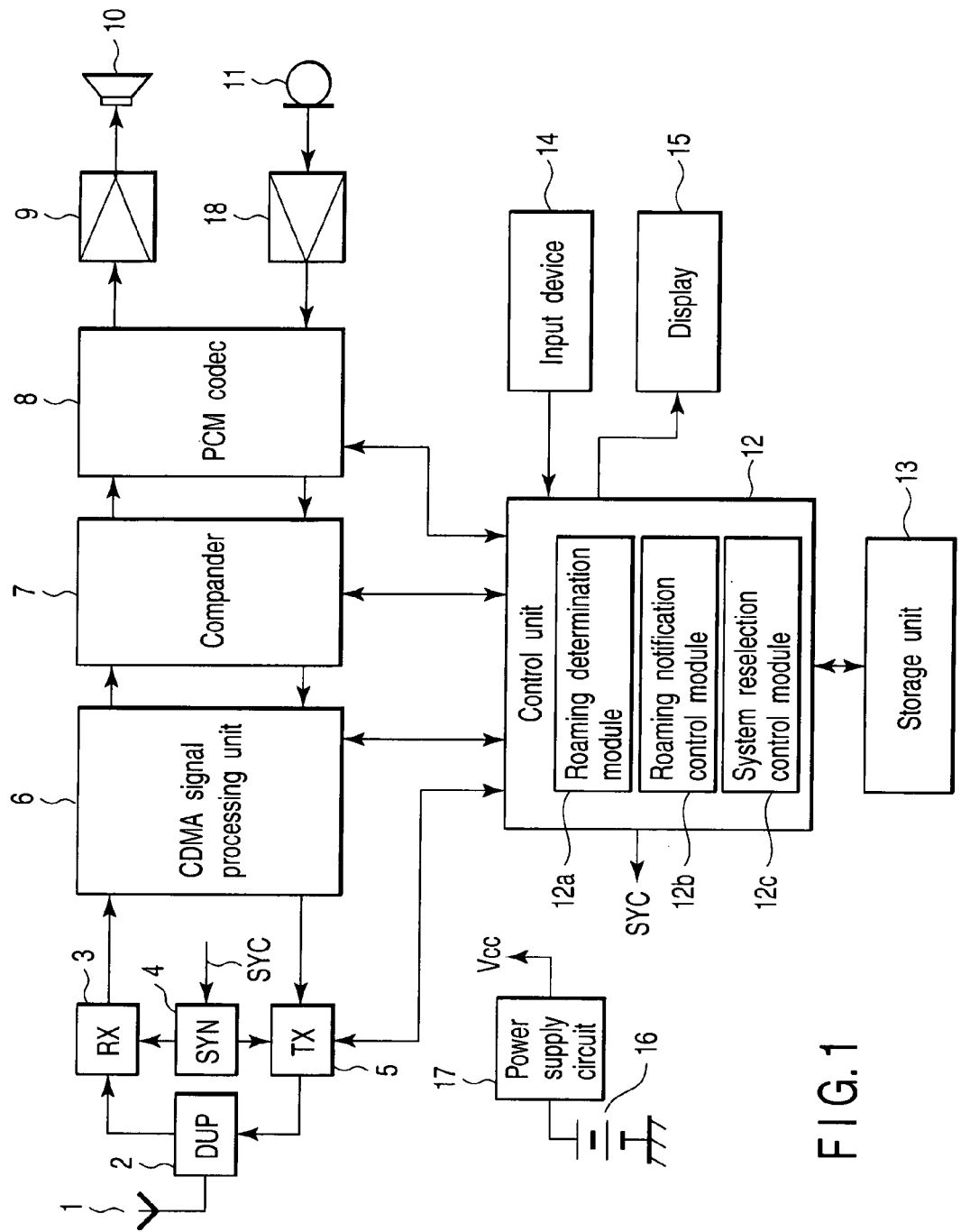
FIG. 1 is a block diagram showing the arrangement of a mobile terminal according to an embodiment of the present invention.

FIG. 1 is a block diagram showing the circuit configuration of a mobile terminal according to an embodiment of the present invention.

Referring to FIG. 1, a radio signal transmitted from a base station (not shown) of a mobile communication network system is received by an antenna 1, and input to a receiving circuit (RX) 3 via a duplexer (DUP) 2. The receiving circuit 3 mixes the received radio signal with a local oscillation signal output from a frequency synthesizer (SYN) 4, thereby down-converting the signal into an intermediate-frequency signal. The receiving circuit 3 processes this intermediate-frequency signal by quadrature demodulation, and outputs a reception baseband signal. Note that the frequency of the local oscillation signal generated by the frequency synthesizer 4 is designated by a control signal SYC output from a control unit 12.

The reception baseband signal is input to a CDMA signal processing unit 6. The CDMA signal processing unit 6 includes an RAKE receiver. The RAKE receiver despreads a plurality of passes included in the reception baseband signal by using spreading codes. The signals of these despread passes are synthesized after their phases are arbitrated. In this manner, reception packet data having a predetermined transmission format is obtained. This reception packet data is input to a compressing/expanding unit (to be referred to as a compander hereinafter) 7.

The compander 7 demultiplexes the output reception packet data from the CDMA signal processing unit 6 into media data by a multiplexer/demultiplexer. The compander 7 individually decodes these demultiplexed media data. For example, if audio data is contained in the reception packet data, this audio data is decoded by a speech codec. Also, if video data is contained in the reception packet data, this video data is decoded by a video codec.

A digital audio signal obtained by the decoding process is input to a PCM coding unit (to be referred to as a PCM codec hereinafter) 8. The PCM codec 8 decodes, by PCM, the digital audio signal output from the compander 7, and outputs an analog audio signal. This analog audio signal is amplified by a reception amplifier 9, and output from a loudspeaker 10.

A digital video signal decoded by the video codec of the compander 7 is input to the control unit 12. The control unit 12 displays the digital video signal output from the compander 7 on a display 15 via a video RAM. The display 15 uses a liquid crystal device (LCD). Note that the control unit 12 displays not only received video data but also video data of an image sensed by a camera (not shown) on the display 15 via the video RAM.

When the reception packet data is data downloaded from a Web site, the compander 7 outputs the downloaded data to the control unit 12. The control unit 12 has a browser, and displays the downloaded data on the display 15 via the video RAM. Note that the display 15 also displays, with unique marks MK, information indicating the operation mode of the apparatus, incoming call notification information, information indicative of the residual amount or charged state of a battery 16, and the like.

A speech signal of a speaker input to a microphone 11 is amplified to an appropriate level by a transmission amplifier 18, coded into a digital audio signal by PCM by the PCM codec 8, and input to the compander 7. Also, an output video signal from the camera (not shown) is converted into a digital signal by the control unit 12, and input to the compander 7. Note that a Web site access request or the like generated by the browser in the control unit 12 is also input from the control unit 12 to the compander 7.

The compander 7 detects the energy amount of the input speech from the digital audio signal output from the PCM codec 8, and determines a transmission data rate on the basis of the detection result. Then, the compander 7 codes the digital audio signal into a signal having a format corresponding to the transmission data rate, thereby generating audio data. Also, the compander 7 codes the digital video signal output from the control unit 12, and generates video data. The multiplexer/demultiplexer multiplexes these audio data and video data in accordance with a predetermined transmission format to generate transmission packet data, and outputs this transmission packet data to the CDMA signal processing unit 6. Note that if a Web site access request is output from the control unit 12, this access request is converted into packet data and output to the CDMA signal processing unit 6.

The CDMA signal processing unit 6 spreads the spectrum of the output transmission packet data from the compander 7 by using a spreading code allocated to a transmission channel, and outputs the signal to a transmitting circuit (TX) 5. The transmitting circuit 5 modulates the signal having the spread spectrum by using a digital modulation method such as quadrature phase shift keying (QPSK). The transmitting circuit 5 synthesizes the modulated transmission signal with the local oscillation signal generated from the frequency synthesizer 4, thereby up-converting the signal into a radio signal. Then, the transmitting circuit 5 amplifies the radio signal to a high frequency so that the transmission power level designated by the control unit 12 is obtained. The amplified radio signal is supplied to the antenna 1 via the duplexer 2, and transmitted from the antenna 1 to the base station of the connection destination mobile communication network system.

Note that a storage unit 13 uses, e.g., an EEPROM or hard disk as a storage medium, and is used to store phone book data, an outgoing call/incoming call log, a received email message, and the like.

An input device 14 has dial keys and function keys. The function keys include a transmission key, end key, power key, volume control key, mode designation key, and cursor key. A power supply circuit 17 generates, from an output from the battery 16, a predetermined operating power supply voltage Vcc, and supplies this voltage to the individual circuits. Note that the battery 16 is charged by a charging circuit (not shown).

The control unit 12 includes a microcomputer. Also, as control functions according to the present invention, the control unit 12 has a roaming determination module 12*a*, roaming notification control 12*b*, and system reselection control module 12*c*. The modules 12*a* to 12*c* are implemented by allowing the microcomputer to execute application programs stored in a program memory (not shown).

When the user performs a communication start request operation with the input device 14, the roaming determination module 12*a* determines whether a currently connected mobile communication network system, i.e., a mobile communication network system currently synchronized with the mobile terminal for standby is a mobile communication network system to which the mobile terminal is subscribed (to be referred to as a subscription mobile communication network system or HOME network hereinafter) or another mobile communication network system serving as the roaming destination (to be referred to as a roaming destination mobile communication network system or ROAM network hereinafter). In this case, the communication start request operation includes, for example, a dial operation for making speech communication, a browser activation operation, a link tag selection operation in the activation state of the browser, and an email transmission operation. However, the present invention is not limited to these examples. The communication start request operation may include another operation of starting communication.

When the roaming determination module 12*a* determines that the currently connected mobile communication network system is the roaming destination mobile communication network system, prior to start of communication, the roaming notification control module 12*b* generates a warning information message indicating roaming, and displays it on the display 15.

When the roaming determination module 12*a* determines that the currently connected mobile communication network system is the roaming destination mobile communication network system, the system reselection control module 12*c* displays a connection destination change request software key (to be referred to as a HOME return key hereinafter) on the display 15 in synchronism with the notification message display operation. When the user operates this HOME return key, the system reselection control module 12c executes system reselection control for reselecting the connection destination mobile communication network system.

The operation of the mobile terminal having the above-described arrangement will be described below.

(1) Outgoing Call Control

Figure 2:
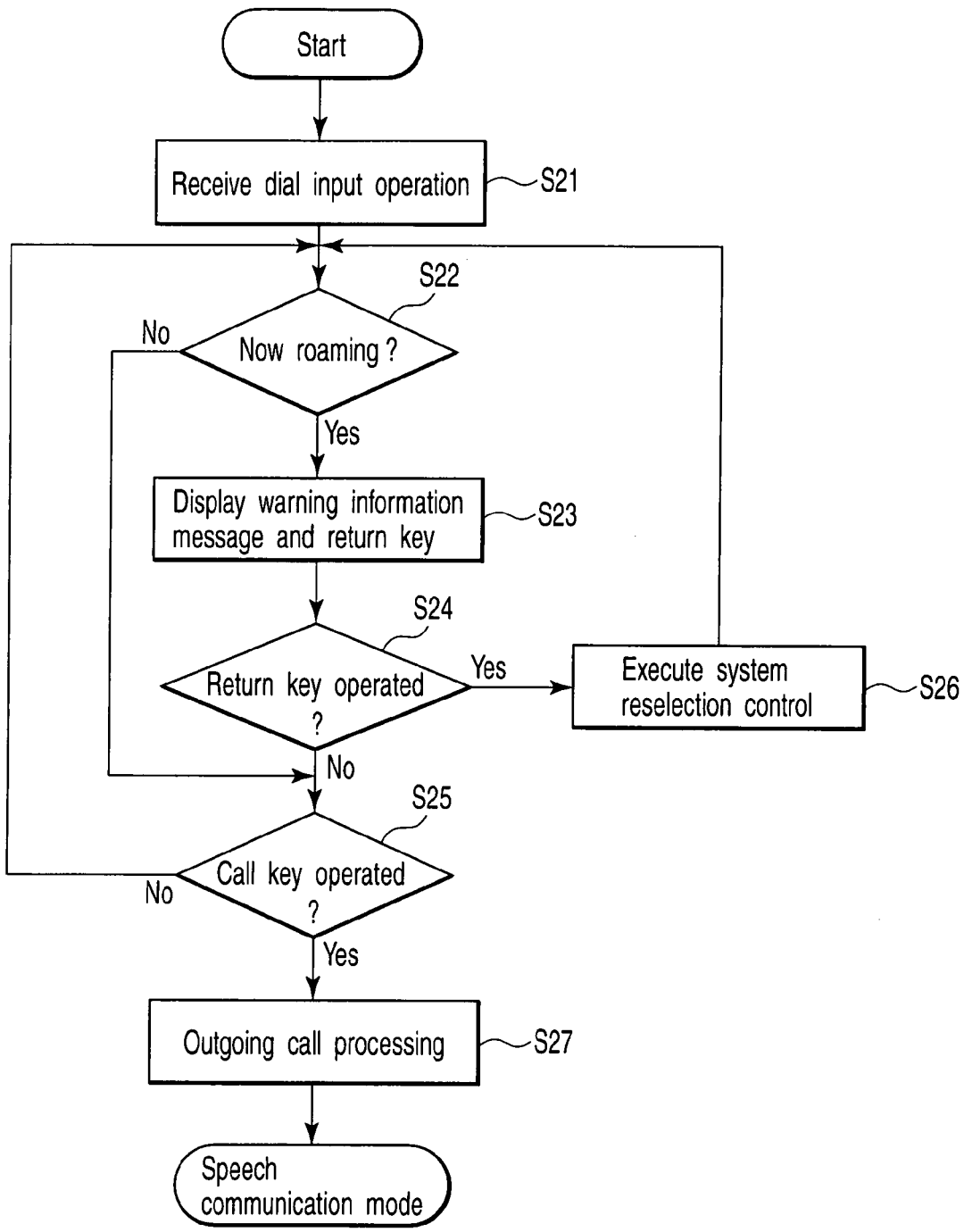
FIG. 2 is a flowchart showing an outgoing call control sequence and its control content in the mobile terminal shown in FIG. 1.
Figure 5:
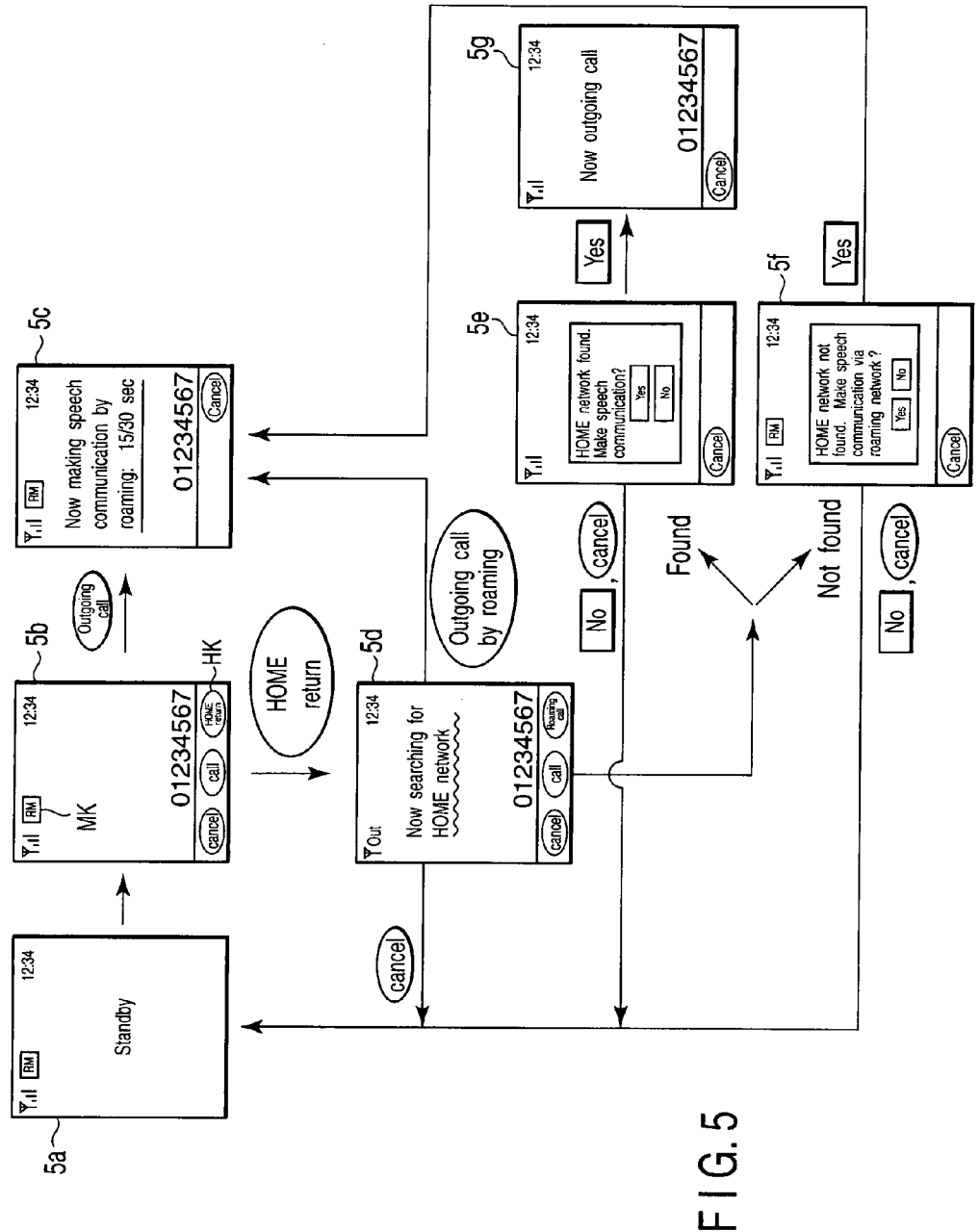
FIG. 5 is a view showing examples of messages displayed on a display in the outgoing call control sequence shown in FIG. 2.

FIG. 2 is a flowchart showing an outgoing call control sequence and its control content in the control unit 12, and FIG. 5 is a view showing examples of windows displayed on the display 15 in outgoing call control.

Assume that the user performs a dial operation for an outgoing call in a standby state (5a in FIG. 5). Note that this dial operation includes an operation of inputting a telephone number with the dial key of the input device 14, and an operation of reading out phone book data to select an outgoing call destination.

Upon reception of the dial operation in step S21, the control unit 12 determines in step S22 whether the currently connected mobile communication network system is the subscription mobile communication network system (HOME network) or the roaming destination mobile communication network system (ROAM network). If the mobile terminal is connected to the subscription mobile communication network system, the process shifts to step S25 to monitor the operation of a call key. When the user presses the call key of the input device 14 in this state, the process shifts to step S27, and the control unit 12 performs an outgoing call operation.

When the user is on the move or in an environment such as a downtown area or a street of tall office buildings wherein the received field strength easily changes, the connection destination mobile communication network system may automatically change from the subscription mobile communication network system (HOME network) to the roaming destination mobile communication network system (ROAM network) during a period until the user presses the call key. To cope with this problem, while monitoring the operation of the call key, the control unit 12 monitors in step S22 whether the connection destination mobile communication network system has changed.

On the other hand, assume that the mobile terminal is connected to the roaming destination mobile communication network system. In this case, the process advances from step S22 to step S23, and the control unit 12 generates a warning information message indicating roaming. The control unit 12 then displays this warning information message on the display 15 as shown in 5b in FIG. 5. As the warning information message, a mark (e.g., "RM") MK indicating roaming is used. Also, a message "Now roaming" may be used in place of the mark. At the same time, a warning message or warning beep may be output from the loudspeaker 10.

The control unit 12 displays the connection destination change request software key (HOME return key HK) on the display 15 in synchronism with display of the warning information message as shown in, e.g., 5b in FIG. 5. In this case, a guidance message which prompts the user to operate the HOME return key HK may be displayed together. As the guidance message, a message "To change connection destination to subscription mobile communication network system, please press HOME return key." may be used.

While monitoring the operation of the call key in step S25, the control unit 12 monitors the operation of the HOME return key HK in step S24 in a state wherein the warning information message and the HOME return key HK are displayed. In this state, assume that the user selects and operates the HOME return key HK in order to change the connection destination mobile communication network system from the roaming destination mobile communication network system (ROAM network) to the subscription mobile communication network system (HOME network). With this operation, the process shifts to step S26, and the control unit 12 executes the system reselection control to reselect the connection destination mobile communication network system. Reference number 5d in FIG. 5 denotes an example of message information displayed on the display 15 in the system reselection control, and a message "Searching for HOME network" is displayed.

Under such system reselection control, the control unit 12 first searches for a connectable mobile communication network system in accordance with a pilot signal transmitted from a base station. When the base station of the subscription mobile communication network system (HOME network) is found by this search, a sequence for synchronizing the mobile terminal with the base station will be implemented. After the mobile terminal is synchronized with the base station, the connection destination changes to the subscription mobile communication network system (HOME network). On the other hand, if the base station of the subscription mobile communication network system is not found by this search, the connection destination returns to the roaming destination mobile communication network system (ROAM network) again. Reference number 5e in FIG. 5 denotes an example of a message displayed on the display 15 if the HOME network can be found. Reference number 5f in FIG. 5 denotes an example of a message displayed on the display 15 if the HOME network cannot be found.

When the connection destination changes to the subscription mobile communication network system (HOME network) by the above-described system reselection control, while confirming in step S22 whether the mobile terminal is in the roaming state, the control unit 12 monitors the operation of the call key in step S25. When the user presses the call key in this state, the process shifts to step S27 to perform the call process. Reference number 5g in FIG. 5 denotes an example of a message displayed on the display 15 if the user performs this call operation. In this manner, the connection destination changes to the subscription mobile communication network system in accordance with the user operation, and after that speech communication can be made via the subscription mobile communication network system (HOME network).

On the other hand, if the connection destination does not change to the subscription mobile communication network system (HOME network) even by the system reselection control, the control unit 12 repeats processes in steps S22 to S25. When the user operates the call key, the control unit 12 determines that the user approves speech communication via the roaming destination mobile communication network system (ROAM network). The process then shifts to step S27, and the control unit 12 performs the call process. Reference number 5c in FIG. 5 denotes an example of a message displayed on the display 15 if the call operation is performed via the roaming destination mobile communication network system. For example, a message "Now making speech communication by roaming: ¥15/30 sec" is displayed.

(2) Browser Activation Control

Figure 3:
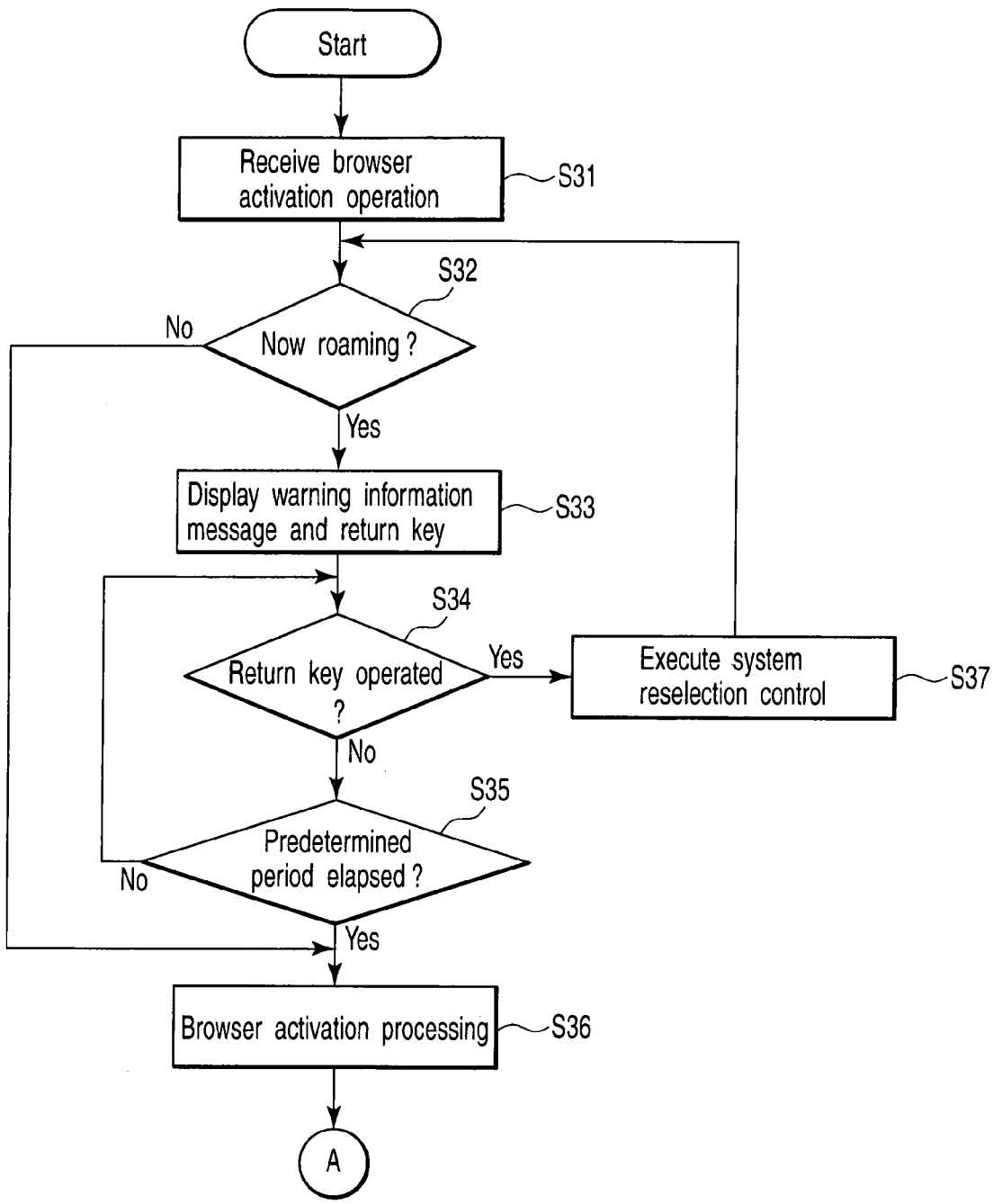
FIG. 3 is a flowchart showing a browser activation control sequence and its control content in the mobile terminal shown in FIG. 1.
Figure 6:
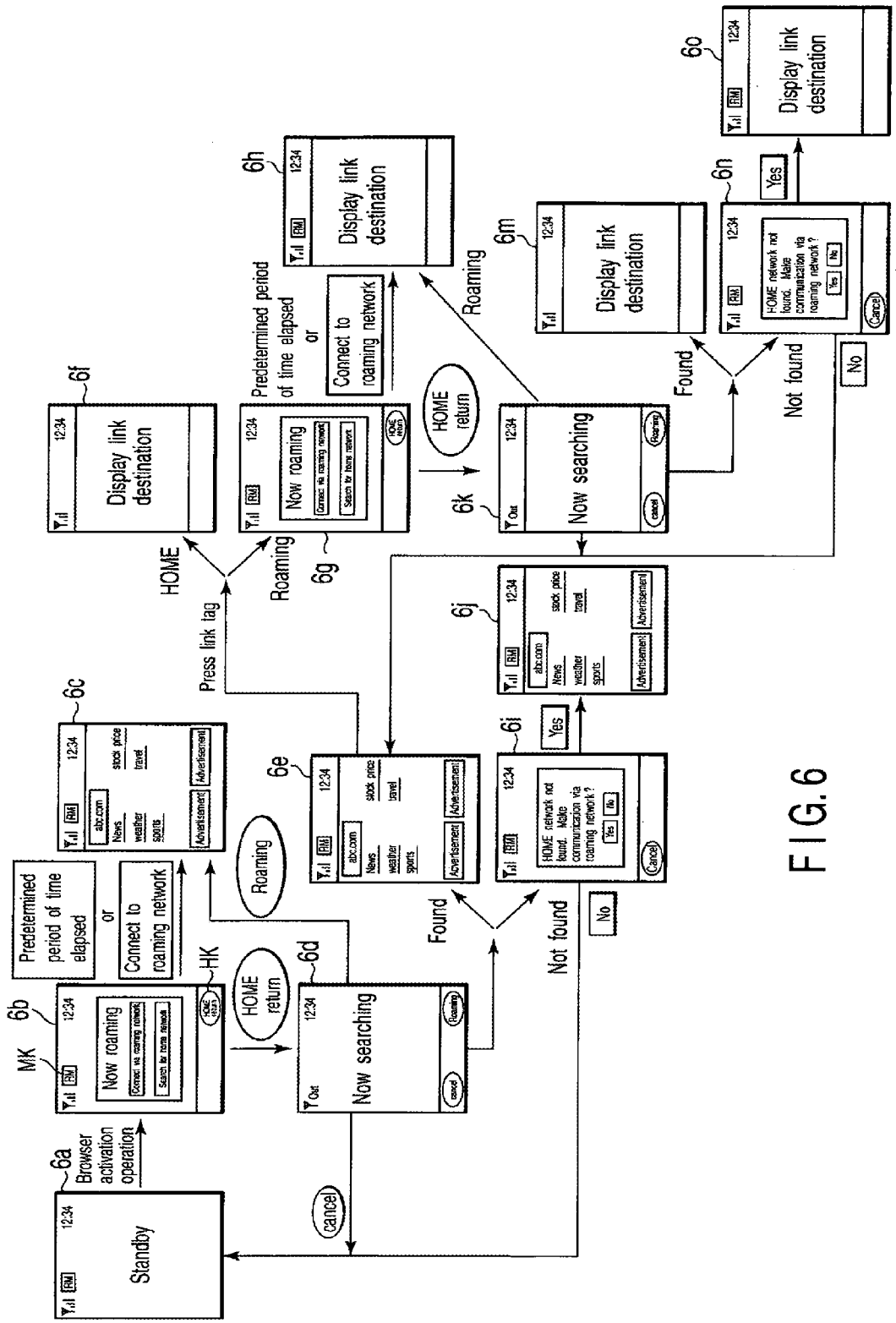
FIG. 6 is a view showing examples of messages displayed on a display in the browser activation control sequence and the link change control sequence shown in FIGS. 3 and 4.

FIG. 3 is a flowchart showing a control sequence and its control content if the control unit 12 activates a browser, and FIG. 6 is a view showing examples of information displayed on the display 15 in a browser activation process and a link destination change process (to be described later).

Assume that the user performs an operation for activating the browser in a standby state (6a in FIG. 6). Upon reception of the dial operation in step S31, the control unit 12 determines in step S32 whether the currently connected mobile communication network system is the subscription mobile communication network system (HOME network) or the roaming destination mobile communication network system (ROAM network). If the mobile terminal is connected to the subscription mobile communication network system (HOME network), the process shifts to step S36 to activate the browser.

On the other hand, assume that the mobile terminal is currently connected to the roaming destination mobile communication network system (ROAM network). In this case, the process advances from step S32 to step S33, and the control unit 12 generates a mark ("RM") MK and warning information message indicating roaming. The control unit 12 then displays the mark MK and warning information message on the display 15 as shown in 6b in FIG. 6. As the warning information message, a message "Now roaming" is used. At the same time, a warning message or warning beep may be output from the loudspeaker 10.

The control unit 12 displays the connection destination change request software key (HOME return key HK) on the display 15 in synchronism with display of the mark MK and warning information message as shown in 6b in FIG. 6. In this case, a guidance message which prompts the user to operate the HOME return key HK may be displayed together. As the guidance message, a message "When you want to change a connection destination to the subscription mobile communication network system, please operate the HOME return key HK." may be used.

The control unit 12 monitors the operation of the HOME return key HK in step S34 in a state wherein the warning information message and the HOME return key HK are displayed. In this state, assume that the user operates the HOME return key HK within a predetermined period of time after the HOME return key HK is displayed, in order to change the connection destination mobile communication network system from the roaming destination mobile communication network system (ROAM network) to the subscription mobile communication network system (HOME network). With this operation, the process shifts to step S37, and the control unit 12 executes the system reselection control to reselect the connection destination mobile communication network system. Reference number 6d in FIG. 6 denotes an example of information displayed on the display 15 in the system reselection control, and a message "Now searching" is displayed.

As in the outgoing call control described in (1), under such system reselection control, the control unit 12 first searches for a connectable mobile communication network system in accordance with a pilot signal transmitted from a base station. When the base station of the subscription mobile communication network system is found by this search, a sequence for synchronizing the mobile terminal with the base station will be implemented. After the mobile terminal is synchronized with the base station, the connection destination changes to the subscription mobile communication network system. On the other hand, if the base station of the subscription mobile communication network system is not found by this search, the connection destination returns to the roaming destination mobile communication network system again. Reference number 6i in FIG. 6 denotes an example of information displayed on the display 15 if the HOME network cannot be found.

When the connection destination changes to the subscription mobile communication network system (HOME network) by the above-described system reselection control, after confirming in step S32 whether the mobile terminal is in the roaming state, the process shifts to step S36, and the control unit 12 executes the browser activation process. Reference number 6e in FIG. 6 denotes an example of information displayed on the display 15 if the browser is activated in the HOME network. In this manner, the connection destination changes to the subscription mobile communication network system in accordance with the user operation, and after that, Web site browsing, information detection, content download, and the like can be executed via the subscription mobile communication network system.

On the other hand, assume that the connection destination does not change to the subscription mobile communication network system even by the system reselection control. In this case, the control unit 12 redetermines in step S32 whether the mobile terminal is in the roaming state. The control unit 12 displays, in step S33, the warning information message indicating roaming, and after that, the process shifts to step S34. While monitoring in step S35 whether a predetermined period of time has elapsed after the HOME return key HK is displayed, the control unit 12 monitors the operation of the HOME return key HK in step S34. In this state, assume that the predetermined period of time has elapsed before the user operates the HOME return key HK. In this case, the control unit 12 determines that the user approves the communication via the roaming destination mobile communication network system. The process shifts to step S36, and the control unit 12 activates the browser. Reference number 6j in FIG. 6 denotes an example of information displayed on the display 15 if the browser is activated via the roaming destination mobile communication network system.

(3) Control in Browser Activation

When a browser is activated, and the connection state between the mobile terminal and the subscription mobile communication network system cannot be maintained upon changing a radio environment or the like, the mobile terminal may change the connection destination mobile communication network system to the roaming destination mobile communication network system. In this case, if the user performs a detection operation or content acquisition operation without knowing that the connection destination has changed, information detection or content download is executed via the roaming destination mobile communication network system, and an unexpectedly high communication fee will be charged.

Figure 4:
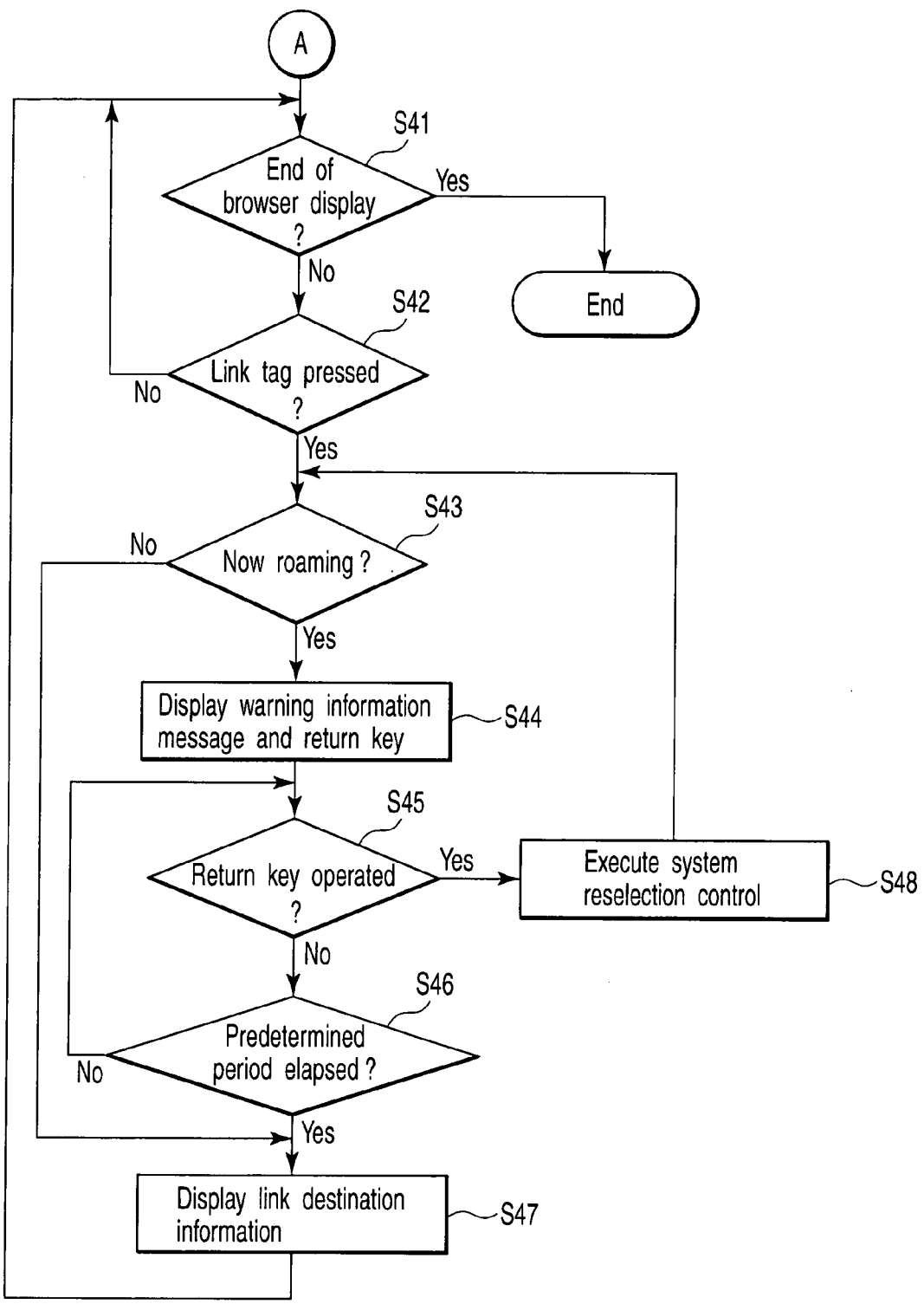
FIG. 4 is a flowchart showing a link destination change control sequence and its control content in the mobile terminal shown in FIG. 1.

To avoid such a problem, even if the browser is activated, the control unit 12 controls to make the user recognize that the mobile terminal is in the roaming state. FIG. 4 is a flowchart showing a control sequence and its control content.

That is, while monitoring the end of browser display in step S41, the control unit 12 monitors in step S42 whether a link tag is pressed. In this state, assume that the user presses the link tag in order to acquire information from a new link destination. In response to this operation, the control unit 12 determines in step S43 whether the currently connected mobile communication network system is the subscription mobile communication network system or the roaming destination mobile communication network system. If the mobile terminal is connected to the subscription mobile communication network system, the process shifts to step S47 to receive information from the new link destination corresponding to the link tag, and the control unit 12 displays the information on the display 15 as shown in 6f in FIG. 6.

On the other hand, assume that the connection destination of the mobile terminal changes to the roaming destination mobile communication network system. In this case, the process advances from step S43 to step S44, and the control unit 12 generates a warning information message indicating roaming, as in the browser activation described in (2). The control unit 12 then displays this warning information message on the display 15 as shown in 6g in FIG. 6. The control unit 12 also displays the connection destination change request software key (HOME return key HK) on the display 15 in synchronism with display of the warning information message as shown in, e.g., 6g in FIG. 6.

The control unit 12 monitors the operation of the HOME return key HK in step S45 in a state wherein the warning information message and the HOME return key HK are displayed. In this state, if the predetermined period of time has elapsed before the user operates the HOME return key HK, the control unit 12 determines that the user approves information detection or content download via the roaming destination mobile communication network system. The process shifts to step S47, and the control unit 12 acquires information from the new link destination, and displays it on the display 15 as shown in 6h in FIG. 6.

On the other hand, assume that the user selects and operates the HOME return key HK within a predetermined period of time after the HOME return key HK is displayed, in order to change the connection destination mobile communication network system from the roaming destination mobile communication network system to the subscription mobile communication network system. With this operation, the process shifts to step S48, and the control unit 12 executes the system reselection control to reselect the connection destination mobile communication network system. Reference number 6k in FIG. 6 denotes an example of information displayed on the display 15 in the system reselection control, and a message "Now searching" is displayed as in 6d.

As in the browser activation control described in (2), under such system reselection control, the control unit 12 first searches for a connectable mobile communication network system in accordance with a pilot signal transmitted from a base station. When the base station of the subscription mobile communication network system is found by this search, a sequence for synchronizing the mobile terminal with the base station will be implemented. After the mobile terminal is synchronized with the base station, the connection destination changes to the subscription mobile communication network system. On the other hand, if the base station of the subscription mobile communication network system is not found by this search, the connection destination returns to the roaming destination mobile communication network system again. Reference number 6n in FIG. 6 denotes an example of information displayed on the display 15 if the HOME network cannot be found.

When the connection destination changes to the subscription mobile communication network system (HOME network) by the above-described system reselection control, after confirming in step S43 whether the mobile terminal is in the roaming state by way of caution, the process shifts to step S47, and the control unit 12 display the information of the link destination. Reference number 6m in FIG. 6 denotes an example of information displayed on the display 15 if accessing the new link destination in the HOME network. In this manner, the connection destination changes to the subscription mobile communication network system in accordance with the user operation, and the link destination change process is performed via the subscription mobile communication network system. After that, Web site browsing, information detection, content download, and the like can be executed.

On the other hand, assume that the connection destination does not change to the subscription mobile communication network system even by the system reselection control. In this case, the control unit 12 redetermines in step S43 whether the mobile terminal is in the roaming state. The control unit 12 displays, in step S44, the warning information message indicating roaming on the display 15 as in 6n in FIG. 6, and after that, the process shifts to step S45. While monitoring in step S46 whether a predetermined period of time has elapsed after the HOME return key HK is displayed, the control unit 12 monitors the operation of the HOME return key HK in step S45. In this state, the predetermined period of time has elapsed before the user operates the HOME return key HK. In this case, the control unit 12 determines that the user approves information detection or content download via the roaming destination mobile communication network system. The process shifts to step S47, and the control unit 12 acquires information from the new link destination, and displays it on the display 15 as in 6o in FIG. 6.

As described above, in this embodiment, if the user operates the dial operation or browser activation operation in the standby state or if the user operates the link tag in a browser activation state, it is determined whether the currently connected mobile communication network system is the subscription mobile communication network system or the roaming destination mobile communication network system before a call process, browser activation process, and link destination access process. When the mobile terminal is connected to the roaming destination mobile communication network system, the warning information message indicating roaming is generated, and displayed on the display 15. Also, the HOME return key HK is displayed on the display 15, and the system reselection control is executed to reselect the connection destination mobile communication network system if the user selects and operates the HOME return key HK.

Accordingly, if the mobile terminal is connected to the roaming destination mobile communication network system, prior to the outgoing call, browser activation, or link destination change, the user can recognize that the mobile terminal is in the roaming state. The user can also try to change the connection destination to the subscription mobile communication network system by operating the HOME return key HK. As a result, the present invention can prevent a trouble that the user performs communication without knowing the roaming state of the mobile terminal, thereby preventing an unnecessary trouble about a communication fee or the like.

At the start of communication, the system reselection control is executed in response to the operation of the HOME return key HK by the user as needed. Hence, the mobile terminal need not periodically perform the system reselection control in order to return the connection destination to the subscription mobile communication network system, thereby reducing unnecessary power consumption, and prolonging the battery life.

Note that the present invention is not limited to this embodiment. For example, in this embodiment, if the connection destination mobile communication network system is the roaming destination communication network, the mobile terminal displays the warning information message indicating roaming, and the HOME return key HK. The mobile terminal then executes the system reselection control if the user operates the HOME return key HK. However, the present invention is not limited to this. When the connection destination mobile communication network system is the roaming destination communication network, the mobile terminal may first try to change the connection destination to the subscription mobile communication network system by automatically executing the system reselection control, and then display the warning information message indicating roaming and the HOME return key HK only if the connection destination remains the roaming destination mobile communication network system even by this change process. With this operation, the user may operate the HOME return key HK only if the connection destination does not change to the subscription mobile communication network system by the automatic system reselection control, thereby improving user's operability.

In this embodiment, the system reselection control can be endlessly performed until the connection destination changes to the subscription mobile communication network system by pressing the HOME return key HK by the user prior to the start of communication. However, the present invention is not limited to this. The number of times of operation for the HOME return key HK may be limited to a predetermined value or less. This can suppress an increase in power consumption caused by the repeatedly-performed system reselection control, thereby prolonging the battery life.

Additionally, for the type and arrangement of the mobile terminal, the call control, the browser activation control, the sequence and content of the link destination change control, the type of the mobile communication network system, the content and notification method of the warning information message, and the like, various modifications may be effected without departing from the spirit or scope of the present invention.

Note that the present invention is not limited to the above embodiments, and can be variously modified and implemented without departing from the spirit or scope of the invention upon practice. Various inventions can be achieved by an appropriate combination of building components disclosed in the embodiment. For example, several building components may be omitted from all the building components described in the embodiment. Further, building components in different embodiments may be properly combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal adapted to be selectively connected to a first mobile communication network system as a subscription mobile communication network system and a second mobile communication network system as a roaming destination mobile communication network system, the terminal comprising:
   a determination module configured to determine, if a communication request is input, whether a currently-connected connection destination mobile communication network system is the first mobile communication network system or the second mobile communication network system;
   a notification module configured to notify, prior to communication, a mobile terminal user of information indicating a roaming state, if it is determined that the currently-connected connection destination mobile communication network system is the second mobile communication network system;
   a reception module configured to receive an input of a connection destination change request, if the user is notified of the information indicating the roaming state; and
   a reselection process module configured to perform, if the input of the change request is received, a mobile communication network system reselection process for changing the connection destination mobile communication network system from the second mobile communication network system to the first mobile communication network system;
   wherein the determination module determines whether the currently-connected connection destination mobile communication network system is the first mobile communication network system or the second mobile communication network system, if an access request to a new link destination is input in a browser activation state,
   wherein if the input of the change request is not received, the determination module redetermines whether the mobile terminal is in the roaming state, and if in the roaming state, the notification module notifies the mobile terminal user of second information indicating the roaming state; and
   wherein if no input is received for a predetermined period of time after the notification of the second information, the determination module determines that the user approves the communication via the second mobile communication network system.

2. The terminal according to claim 1, wherein the reception module configured to receive the input of the change request comprises a module configured to display a software key for inputting the change request on a display in synchronism with a notification operation of the notification module for notifying the user of the information indicating the roaming state, and a module configured to recognize an operation of the software key as a change request input operation.

3. A mobile terminal adapted to be selectively connected to a first mobile communication network system as a subscription mobile communication network system and a second mobile communication network system as a roaming destination mobile communication network system, the terminal comprising:
   a determination module configured to determine, if a communication request is input, whether a currently-connected connection destination mobile communication network system is the first mobile communication network system or the second mobile communication network system;
   a notification module configured to notify, prior to communication, a mobile terminal user of information indicating a roaming state, if it is determined that the currently-connected connection destination mobile communication network system is the second mobile communication network system;
   a reception module configured to receive an input of a connection destination change request, if the user is notified of the information indicating the roaming state;
   a reselection process module configured to perform, if the input of the change request is received, a mobile communication network system reselection process for changing the connection destination mobile communication network system from the second mobile communication network system to the first mobile communication network system;
   a redetermination module configured to determine whether the mobile communication network system reselection process of the reselection process module changes the connection destination mobile communication network system to the first mobile communication network system;
   a renotification module configured to renotify the mobile terminal user of the information indicating the roaming state, if it is determined that the reselection process does not change the connection destination mobile communication network system to the first mobile communication network system;
a rereception module configured to rereceive the input of the connection destination change request, if the user is renotified of the information indicating the roaming state; and
a repeated reselection process module configured to reperform, if the input of the change request is rereceived, the mobile communication network system reselection process for changing the connection destination mobile communication network system from the second mobile communication network system to the first mobile communication network system.

4. The terminal according to claim 3, wherein the determination module determines, whether the currently-connected connection destination mobile communication network system is the first mobile communication network system or the second mobile communication network system, if a speech communication request is input in a standby state.

5. The terminal according to claim 3, wherein the determination module determines whether the currently-connected connection destination mobile communication network system is the first mobile communication network system or the second mobile communication network system, if a browser activation request is input in a standby state.

6. The terminal according to claim 3, wherein the determination module determines whether the currently-connected connection destination mobile communication network system is the first mobile communication network system or the second mobile communication network system, if an access request to a new link destination is input in a browser activation state.

7. The terminal according to claim 3, wherein the reception module configured to receive the input of the change request comprises a module configured to display a software key for inputting the change request on a display in synchronism with a notification operation of the notification module for notifying the user of the information indicating the roaming state, and a module configured to recognize an operation of the software key operation as a change request input operation.

8. The terminal according to claim 3, further comprising:
a stop module configured to count a number of repeated processes from the redetermination process of the redetermination module until the reselection process of the repeated reselection process module, and to stop the reselection process after a count value reaches a predetermined upper limit.

9. A mobile terminal adapted to be selectively connected to a first mobile communication network system as a subscription mobile communication network system and a second mobile communication network system as a roaming destination mobile communication network system, the terminal comprising:
a determination module configured to determine, if a communication request is input, whether a currently-connected connection destination mobile communication network system is the first mobile communication network system or the second mobile communication network system;
an automatic reselection module configured to perform, if it is determined that the currently-connected connection destination mobile communication network system is the second mobile communication network system, a mobile communication network system reselection process for changing the connection destination mobile communication network system from the second mobile communication network system to the first mobile communication network system;
a module configured to determine whether the mobile communication network system reselection process of the automatic reselection module changes the connection destination mobile communication network system to the first mobile communication network system;
a notification module configured to notify, prior to communication, a mobile terminal user of information indicating a roaming state, if it is determined that the reselection process does not change the connection destination mobile communication network system to the first mobile communication network system;
a reception module configured to receive an input of a connection destination change request, if the user is notified of the information indicating the roaming state; and
a manual reselection module configured to perform, if the input of the change request is received, the mobile communication network system reselection process for changing the connection destination mobile communication network system from the second mobile communication network system to the first mobile communication network system;
wherein the determination module determines whether the currently-connected connection destination mobile communication network system is the first mobile communication network system or the second mobile communication network system, if an access request to a new link destination is input in a browser activation state,
wherein if the input of the change request is not received, the determination module redetermines whether the mobile terminal is in the roaming state, and if in the roaming state, the notification module notifies the mobile terminal user of second information indicating the roaming state; and
wherein if no input is received for a predetermined period of time after the notification of the second information, the determination module determines that the user approves the communication via the second mobile communication network system.

10. A connection destination change method for a mobile terminal, comprising:
determining, if a communication request is input, whether a currently-connected connection destination mobile communication network system is a first subscription mobile communication network system or a second roaming destination mobile communication network system;
notifying prior to communication, a mobile terminal user of information indicating a roaming state, if it is determined that the currently-connected connection destination mobile communication network system is the second mobile communication network system,
monitoring an input of a connection destination change request, if the user is notified of the information indicating the roaming state; and
performing, if the input of the change request is received, a mobile communication network system reselection process for changing the connection destination mobile communication network system from the second mobile communication network system to the first mobile communication network system;
wherein the determining whether the currently-connected connection destination mobile communication network system is the first mobile communication network system or the second mobile communication network system is performed if an access request to a new link destination is input in a browser activation state, wherein if the input of the change request is not received, the determination module redetermines whether the mobile terminal is in the roaming state, and if in the roaming state, the notification module notifies the mobile terminal user of second information indicating the roaming state; and wherein if no input is received for a predetermined period of time after the notification of the second information, the determination module determines that the user approves the communication via the second mobile communication network system.

11. The method according to claim 10, wherein monitoring the input of the change request comprises displaying a software key for inputting the change request on a display in synchronism with a notification operation of notifying the user of the information indicating the roaming state, and recognizing an operation of the software key as a change request input operation.

12. A connection destination change method of a mobile terminal, comprising:
determining, if a communication request is input, whether a currently-connected connection destination mobile communication network system is a first subscription mobile communication network system or a second roaming destination mobile communication network system;
notifying, prior to communication, a mobile terminal user of information indicating a roaming state, if it is determined that the currently-connected connection destination mobile communication network system is the second mobile communication network system;
monitoring an input of a connection destination change request, if the user is notified of the information indicating the roaming state;
performing, if the input of the change request is received, a mobile communication network system reselection process for changing the connection destination mobile communication network system from the second mobile communication network system to the first mobile communication network system;
determining whether the mobile communication network system reselection process changes the connection destination mobile communication network system to the first mobile communication network system;
renotifying the mobile terminal user of the information indicating the roaming state, if it is determined that the connection destination mobile communication network system does not change to the first mobile communication network system,
remonitoring the input of the connection destination change request, if the user is renotified of the information indicating the roaming state; and
reperforming, if the input of the change request is rereceived, the mobile communication network system reselection process for changing the connection destination mobile communication network system from the second mobile communication network system to the first mobile communication network system.

13. The method according to claim 12, wherein
determining whether the currently-connected connection destination mobile communication network system is the first mobile communication network system or the second mobile communication network system is performed if a speech communication request is input in a standby state.

14. The method according to claim 12, wherein the determining whether the currently-connected connection destination mobile communication network system is the first mobile communication network system or the second mobile communication network system is performed if a browser activation request is input in a standby state.

15. The method according to claim 12, wherein the determining whether the currently-connected connection destination mobile communication network system is the first mobile communication network system or the second mobile communication network system is performed if an access request to a new link destination is input in a browser activation state.

16. The method according to claim 12, wherein monitoring the input of the change request comprises displaying a software key for inputting the change request on a display in synchronism with a notification operation of notifying the user of the information indicating the roaming state, and recognizing an operation of the software key as a change request input operation.

17. The method according to claim 12, further comprising:
counting a number of repeated operations from the redetermination process until the reselection process, and stopping the reselection process after a count value reaches a predetermined upper limit.

* * * * *